United States Patent [19]
Kimura et al.

[11] 3,748,986
[45] July 31, 1973

[54] MOTOR DRIVE SYSTEM FOR CAMERA

[75] Inventors: Shuji Kimura; Koichi Daitoku, both of Tokyo, Japan

[73] Assignee: Nippon Kogaku K.K., Tokyo, Japan

[22] Filed: June 1, 1972

[21] Appl. No.: 258,837

[52] U.S. Cl. .................................................. 95/31
[51] Int. Cl. ........................................... G03b 19/04
[58] Field of Search .................................. 95/31, 34

[56] References Cited
UNITED STATES PATENTS
3,656,420  4/1972  Aizawa ............................ 95/31 EL

*Primary Examiner*—John M. Horan
*Attorney*—Joseph M. Fitzpatrick et al.

[57] ABSTRACT

A motor drive system for a camera comprises a short-film motor drive means including a first motor for charging the camera's shutter and winding a film, and actuating a shutter releasing means; and a long-film magazine including a second motor for rotating a long-film take-up shaft to take up a film. The short-film motor drive means and the long-film magazine are separable from each other. A control switch member for the second motor is provided in the short-film motor drive means. The switch member is adapted to be closed with the winding operation of the short-film motor drive means and to be opened upon completion of the winding operation. A cable is provided to electrically connect the switch member with the second motor in the long-film magazine. The two motors are parallel-connected with a power source so that they cooperate to wind the film and charge the shutter and that only the first motor operates to release the shutter.

1 Claim, 6 Drawing Figures

MOTOR DRIVE SYSTEM FOR CAMERA

BACKGROUND OF THE INVENTION

1. Field of the Invention

This invention relates to a motor drive system for cameras, and more particularly, to a motor drive system which comprises short-film motor drive means including a first motor for charging the camera's shutter and winding a film, and a shutter releasing means; and a long-film magazine including a second motor for rotating a long-film take-up shaft, said short-film motor drive means and said long-film magazine being separable from each other.

2. Description of the Prior Art

In the conventional motor drive system for cameras of the type in which a motor drive (hereinafter "drive portion") for a short film, such for example as a 36-frame film (hereinafter referred to as "drive portion"), may also be used for a long-film magazine, such as for film of a length greater than 36 frames, for example, the film winding motion in the drive portion has been associated with the camera's operation and the long-film take-up shaft in the long-film magazine has been mechanically connected to the camera proper (i.e., by means of gears, belts or the like). Such system has been disadvantageous in that the assemblage of the long-film magazine to the drive portion requires minute attention to be paid to the degree of meshing engagement between the gears so as to avoid any unsatisfactory movement or too close engagement therebetween which would result in "heavy" rotation of gears. In addition, the connection between the long-film take-up shaft and the camera proper has usually been of the mechanical type. Furthermore, the drive portion and the long-film magazine have some exposed gear portions which are susceptible to the adverse effect of dust which is very difficult to obviate. In case of a belt-type connection, the belt must be mounted and dismounted each time the long-film magazine is attached and detached; and moreover, the belt is exposed and during use, may contact the user's hand to cause unsatisfactory power transmission, thus making the camera awkward and difficult to handle for best photographic results.

SUMMARY OF THE INVENTION

The present invention provides a motor drive system which compensates for the above-noted disadvantages and permits the drive portion and the long-film magazine to be readily connected together by only an electrical connector.

According to the present invention, the motor drive system comprises a short-film motor drive means including a first motor for charging the camera's shutter and for winding a film, and a shutter releasing means, and a long-film magazine including a second motor for rotating a long-film take-up shaft to take up a film, said short-film motor drive means and said long-film magazine being separable from each other. The motor drive system is characterized by a control switch member for the second motor provided in the short-film motor drive means, the switch member being adapted to be closed with the winding operation of the short-film motor drive means and to be opened upon completion of such winding operation, and a cable for electrically connecting the switch member with the circuit of the second motor in the long-film magazine. The two motors are parallel-connected with a power source so that the two motors cooperate to wind the film and charge the shutter, and so that only the first motor operates to release the shutter.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENT

Figure 1:
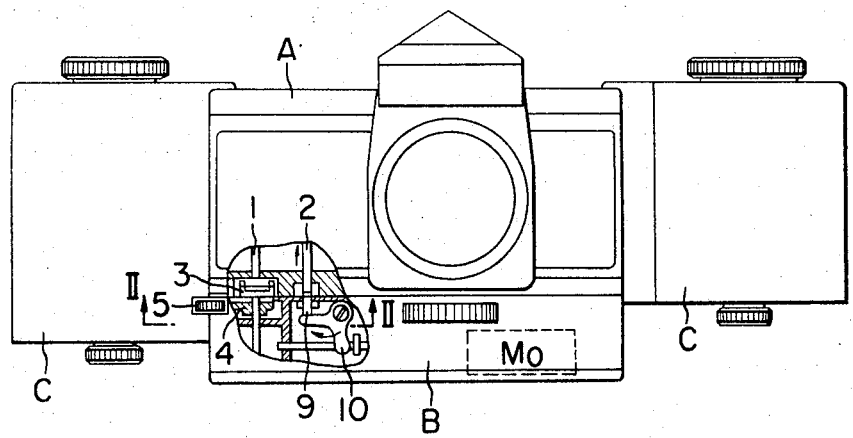
FIG. 1 is a front elevational view of a camera, partly broken away, and utilizing a conventional motor drive system.
Figure 2:
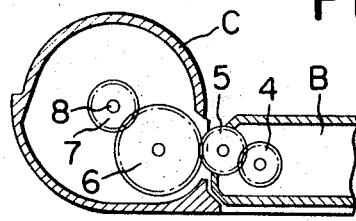
FIG. 2 is a sectional view taken along the line 2—2 of FIG. 1.

Before the present invention is described, the conventional motor drive system will first be explained with reference to FIGS. 1 and 2.

A camera A is of the known type in which a film wind shaft 1 and release shaft 2 are actuated respectively by the movement of a coupling 3 and thrust rod 9 provided in a drive portion B, thereby accomplishing film winding and photo-taking operations. The drive portion B is such that the drive of a motor Mo contained therein acts through an internal mechanism (not shown) to rotate a release lever 10 in the direction of the arrow and with a predetermined timing so as to actuate the thrust rod 9, thus releasing the camera's shutter and rotating the coupling 3 to accomplish the film winding and shutter charge.

The shaft of the coupling 3 has a gear 4 securely mounted thereon so that rotation of the coupling 3 may be transmitted through gears 4 and 5, and further through gears 6 and 7 provided in a long-film magazine C, whereby a shaft 8, integral with the gear 7, takes up a film contained in the magazine C.

Referring now to FIGS. 3 to 6, there is shown an embodiment of the present invention. The camera is generally designated A', the drive portion by B' and the long-film magazine by C'. A motor M1, provided in the drive portion B', has its shaft securely mounting a gear 47 (FIG. 4), which is in engagement with a gear train 46, 45, 50 to transmit the drive from the motor M1 to a cam 43 integral with the gear 50. The cam 43 is in engagement with a roller 42 secured to a bevel gear 41.

The gear 50, which is integral with the cam 43 as mentioned above, is also integral with a flange 44, and is axially movable and biased by an unshown spring so as to urge the cam 43 into engagement with the roller 42. Bearings 40, 48 and 49 are provided, as shown. A bevel gear 28, in engagement with the bevel gear 41, is rotatable relative to a gear shaft 26 and is provided with a ratchet pawl 29, which is in engagement with a ratchet gear 30 integral with the gear shaft 26. Thus, the rotation of the bevel gear 28 may be transmitted through the pawl 29 and ratchet gear 30 to a double-stepped gear 24 via a gear 26a on the gear shaft 26. The gear shaft 26 is rotatable with respect to a coupling shaft 22. Thus, when the rotation of the bevel gear 28 is transmitted to the gear 26a, rotation in the same direction will never be transmitted from the gear 26a to the bevel gear 28.

The double-stepped gear 24 is mounted for rotation on a shaft 25. A gear 23 is retained on the coupling shaft 22 by means of a pin 27, and at one end of the coupling shaft, a coupling pawl 19 is restricted against rotation by a pin 21 and forced into engagement with the end portion 18a of a film take-up shaft 18 by a spring 20. AT the other end of the coupling shaft 22 there is a thrust bearing collar 31, and an insulator plate 35 is mounted for rotation relative to the coupling shaft 22. A friction spring 34 is interposed between the thrust bearing collar 31 and the insulator plate 35.

Figure 5:
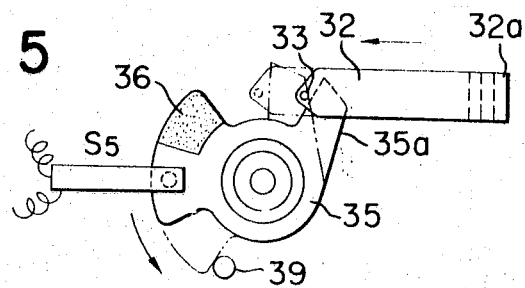
FIG. 5 is an enlarged plan view of the switch portion (S5) shown in FIG. 4.

As shown in FIG. 5, the insulator plate 35 has electrically conductive portions 36 formed on the opposite sides thereof and electrically connected together. A pair of electrical contacts 37 and 38 is adapted to cooperate with the insulator plate 35 so as to constitute a switch $S_5$, which may establish electrically "ON" or "OFF" position, depending on whether the electrical contacts 37 and 38 are engaged by the conductive portions or the insulating portion of the plate 35. Rotation of the coupling shaft 22 will cause rotation of the insulator plate 35 with the aid of the friction spring 34 so as to bring the electrical contacts 37 and 38 into engagement with the conductor portions 36, thus closing the switch $S_5$. A limit pin 39 is provided at such a location that the switch $S_5$ remains closed as long as the coupling shaft 22 is rotated. Any further rotation of the coupling shaft 22 will only result in its slip at the portion corresponding to the friction spring 34, thus maintaining the switch $S_5$ in its "ON" state.

Figure 3:
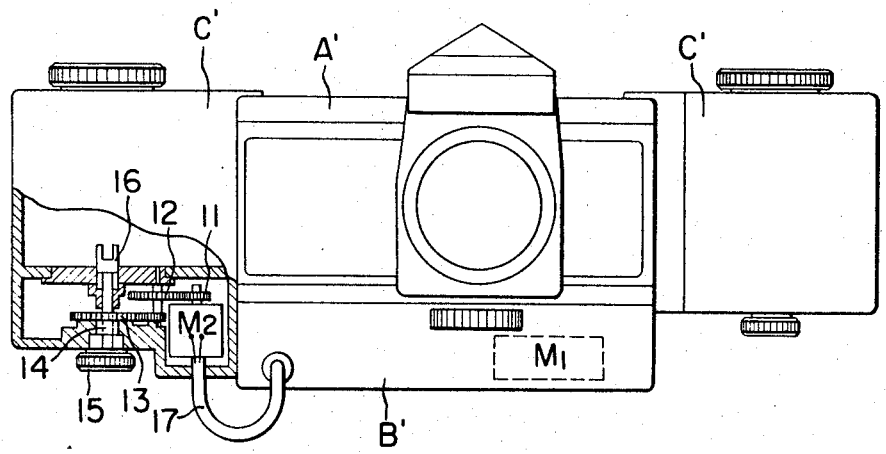
FIG. 3 is a front elevational view of a camera with a motor drive system according to an embodiment of the present invention and broken away to illustrate the take-up side thereof partly in cross-section.

As shown in FIG. 3, the long-film magazine C' includes a long film take-up shaft 16, which is driven from a take-up motor $M_2$ via a gear train 11, 12, 13. A take-up knob 15 is formed integrally with the long-film take-up shaft 16, and the gear 13 is retained to the shaft 16 by means of a pin 14. Electric power is supplied from the drive portion B' to the motor $M_2$ through a line 17.

Figure 6:
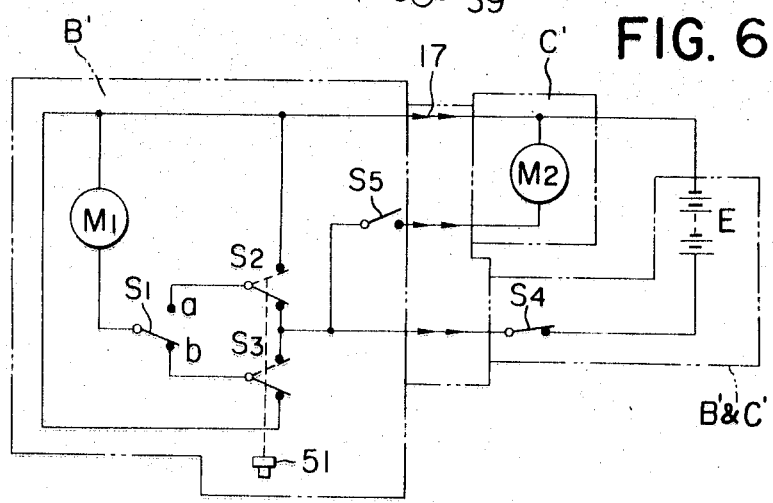
FIG. 6 is a diagram showing the electical connection at the end of the winding operation.

Referring to FIG. 6, E designates a DC source and $S_4$ is a switch operatively associated with an unshown frame counter, which may be of the reverse operation type. The switch $S_4$ is adapted to open when the reverse counter comes to its zero position. Switches $S_3$ and $S_2$ are push-button operated switches which may be changed over simultaneously upon actuation of a push button 51. Switch $S_1$ is such that it is changed over to its contact a for the film winding and shutter charge and to its contact b upon completion of the film winding and for the shutter release.

In operation, the switch $S_4$ is closed with the frame counter (not shown) set to any other suitable position than the zero position and then the push button 51 is depressed to change over the switches $S_3$ and $S_2$ simultaneously, whereby there is formed a closed circuit $E - S_4 - S_3 - S_1b - M_1 - E$, through which the motor $M_1$ is energized. After a shutter release signal is delivered (although the shutter release mechanism is not shown), the switch $S_1$ is closed at its contact a to brake and stop the motor $M_1$. After the film has been exposed, the push button 51 is released to form a closed circuit $E - S_4 - S_2 - S_1a - M_1 - E$, through which the motor $M_1$ is again energized to accomplish the film winding and shutter charge operations. Upon completion of the film winding, the switch $S_1$ is closed at its contact b to brake and stop the motor $M_1$.

Figure 4:
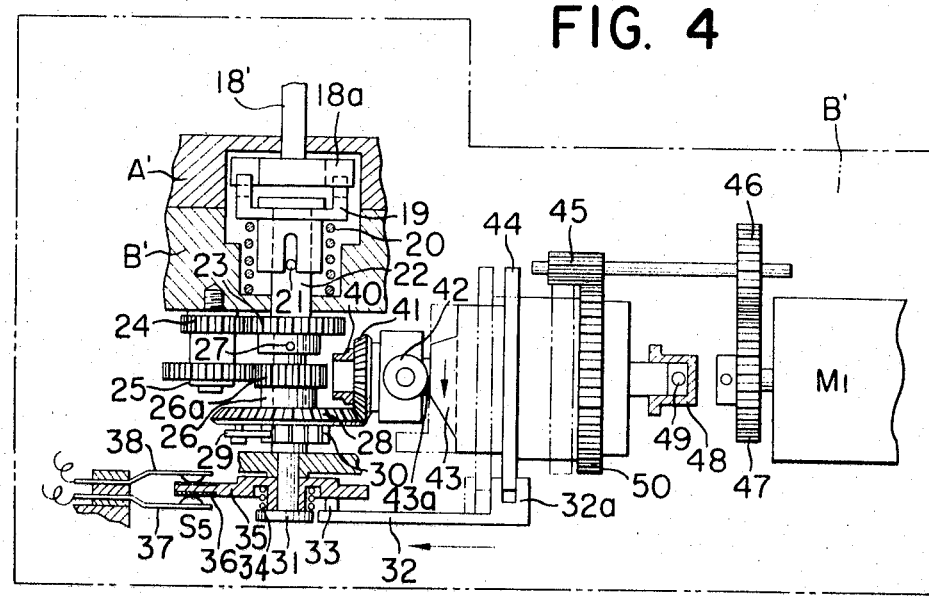
FIG. 4 is an enlarged sectional view showing the drive portion at the end of the winding operation.

On the other hand, the cam 43 and the roller 42 at the end of the film winding operation are in such a relative position that the roller 42 rides on the upper step 43a of the cam 43 (see FIG. 4). When the push button 51 is depressed, the switches $S_2$ and $S_3$ are changed over to their phantom-line positions (FIG. 6) to close the circuit $E - S_4 - S_3 - S_1b - M_1 - E$, through which the motor $M_1$ is energized to thereby bring the roller 42 (FIG. 4) from the upper step down to the lower stp of the cam 43, that is, the cam 43 advances in the direction toward the phantom-line position, whereby the cam 43 actuates the unshown shutter release mechanism to operate the camera's shutter. Upon completion of the shutter release, the switch $S_1$ is changed over to its contact a to form a circuit $M_1 - S_2 - S_1a - M_1$, through which the motor $M_1$ is stopped.

Further, the flange 44, engaged with the lever 32 at the portion 32a, urges the lever 32 in the direction of arrow so that pin 33 escapes from the arm 35a of the insulator plate 35. After the shutter operation of the camera A' has been completed, the push button 51 is released to change over the switches $S_2$ and $S_3$ to their full-line positions, thus forming a circuit $E - S_2 - S_1a - M_1 - E$, through which the motor $M_1$ is energized (that is, the camera is ready to take up the film). Since the load imparted to the bevel gear 44 is small, the ramp of the cam 43 is brought into engagement with the roller 42, which does not pass over the ramp of the cam 43, but transmits the rotation of the bevel gear 41. This causes rotation of the coupling shaft 22 which, in turn, causes the insulator plate 35 to be rotated with the aid of the friction spring 34 in the direction of arrow as indicated in FIG. 5, thus closing the switch $S_5$. The electrical signal thereof is directed through the line 17 to energize the motor $M_2$ through the circuit $E - S_4 - S_5 - M_2 - E$, thereby rotating the long-film take-up shaft 16 to take up the film. When a predetermined amount of the film has been taken up, the camera A' completes its take-up operation with the film take-up shaft 18 now fixed against any further rotation so as to prevent any further amount of film from being taken up. The bevel gear 28 becomes stationary and the cam 43 retracts in the direction opposite to that shown by arrow, to take its upper step position. During such retracting movement of the cam 43, the flange 44 acts through an unshown interlocking member to change over the switch $S_1$ to its contact a, thereby forming a circuit $M_1 - S_1b$ – $S_3$ – $M_1$, through which the motor $M_1$ is deenergized. Also, the lever 32 returns insulator plate 35 to its initial position so that the conductive portions 36 of the plate 35 are disengaged from the contacts 38 and 37 to open the switch $S_5$ and thus cut off the power supply to the motor $M_2$, which is stopped thereby.

Such a cycle of operation of the camera and its drive portion may be repeated as desired.

Thus, according to the present invention, the coupling shaft 22 is rotated only when the film take-up is effected and not rotated during any other time in spite of revolution of the motor $M_1$. Therefore, by providing the coupling shaft 22 with a switch mechanism $S_5$ adapted to be closed upon rotation of the coupling shaft 22, the take-up motor $M_2$ may be supplied with electric power positively and accurately. The presence of the take-up motor $M_2$ enables the long-film magazine C' and the drive portion B' to be positively connected together only by an electrical connector (such as line 17). Moreover, the gears and other internal mechanism have no exposed portion and no opening, and this leads to a dust-proof effect and accordingly to reduced failures in operation.

We believe that the construction and operation of our novel drive system will be understood, and that the several advantages thereof will be fully appreciated by those persons skilled in the art.

We claim:

1. A motor drive system for a camera of the type which comprises a short-film motor drive means including a first motor for charging the camera shutter and winding a film and actuating a shutter releasing means, and a long-film magazine including a second motor for rotating a long-film take-up shaft to take up a film, said short-film motor drive means and said long-film magazine being separable from each other, characterized by a control switch means for said second motor provided in said short-film motor drive means, means acting to close said switch means upon operation of said short-film motor drive means to effect winding, means acting to open said switch means upon completion of such winding operation, and a cable for electrically connecting said switch means with the circuit of said second motor, said motors being parallel-connected with a power source so that the two motors cooperate to wind the film and charge the shutter and that only the first motor operates to release the shutter.

* * * * *

UNITED STATES PATENT OFFICE
CERTIFICATE OF CORRECTION

Patent No. 3,748,986          Dated July 31, 1973

Inventor(s) SHUJI KIMURA and KOICHI DAITOKU

It is certified that error appears in the above-identified patent and that said Letters Patent are hereby corrected as shown below:

Front page, beneath "[21] Appl.No.: 258,837", insert

-- [30]     Foreign Application Priority Data

June 2, 1971   Japan ................... 46/46022 --

Signed and sealed this 6th day of August 1974.

(SEAL)
Attest:

McCOY M. GIBSON, JR.                C. MARSHALL DANN
Attesting Officer                   Commissioner of Patents